Nov. 3, 1925.

E. T. LARKIN

GAS ENGINE

Filed Jan. 30, 1924    2 Sheets-Sheet 1

Inventor
Elwood T. Larkin
by Popp & Powers
Attorneys

Nov. 3, 1925.
E. T. LARKIN
GAS ENGINE
Filed Jan. 30, 1924
1,559,628
2 Sheets-Sheet 2
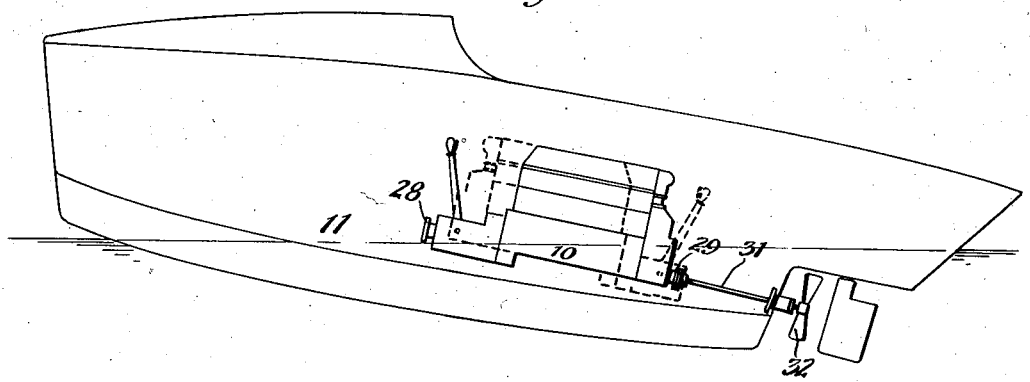
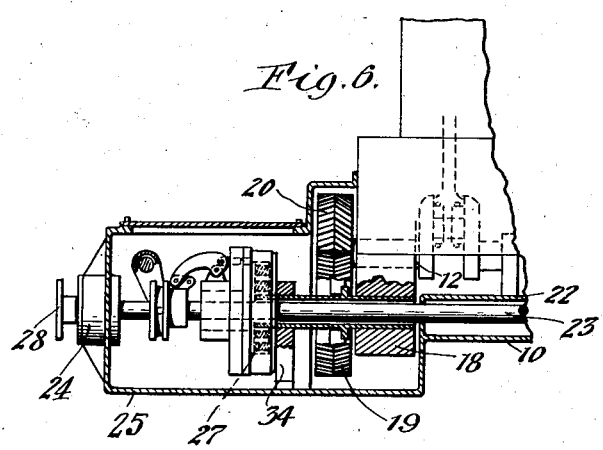
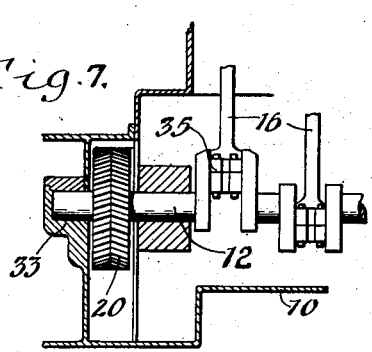
Inventor
Elwood T. Larkin
by Robb & Powers
Attorneys Patented Nov. 3, 1925.

1,559,628

UNITED STATES PATENT OFFICE.

ELWOOD T. LARKIN, OF BUFFALO, NEW YORK, ASSIGNOR TO CHARLES A. CRIQUI, OF BUFFALO, NEW YORK.

GAS ENGINE.

Application filed January 30, 1924. Serial No. 689,530.

*To all whom it may concern:*

Be it known that I, ELWOOD T. LARKIN, a citizen of the United States, residing at Buffalo, in the county of Erie and State of New York, have invented new and useful Improvements in Gas Engines, of which the following is a specification.

This invention relates to a gas engine which is more particularly designed for use as a marine power plant. In such installations there are many features which are desirable to facilitate installation in different classes and shapes of boats such as runabouts which employ high speed propeller shafts and cruisers which employ slow speed propeller shafts. This can best be accomplished by the use of a small bore and short stroke gas engine and it is the object to provide an engine having this capacity which is compact and simple in construction, which allows a lesser propeller shaft angle, so that the boat is propelled forwardly in a more direct line and reduces the tendency to lift or push up the stern of the boat and thus incease the propelling efficiency accordingly.

In the accompanying drawings:—

Figure 1:
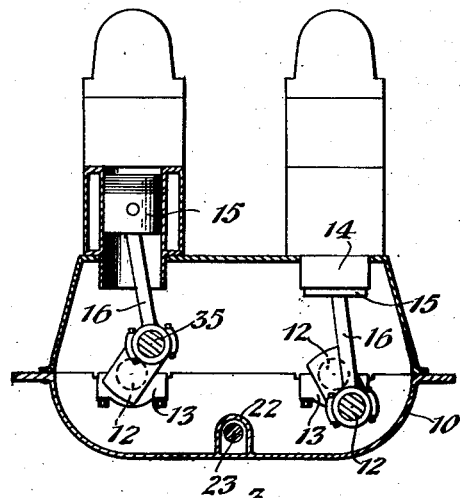
Figure 3:
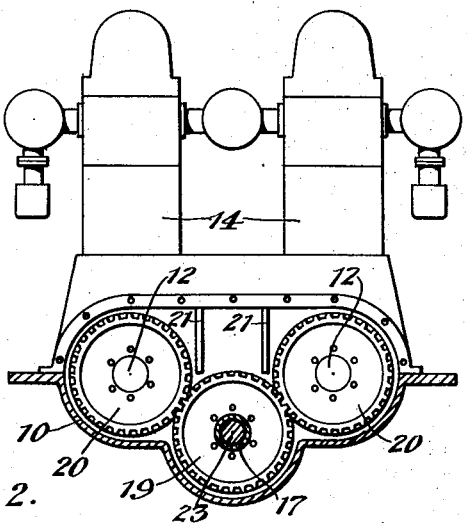
Figure 2:
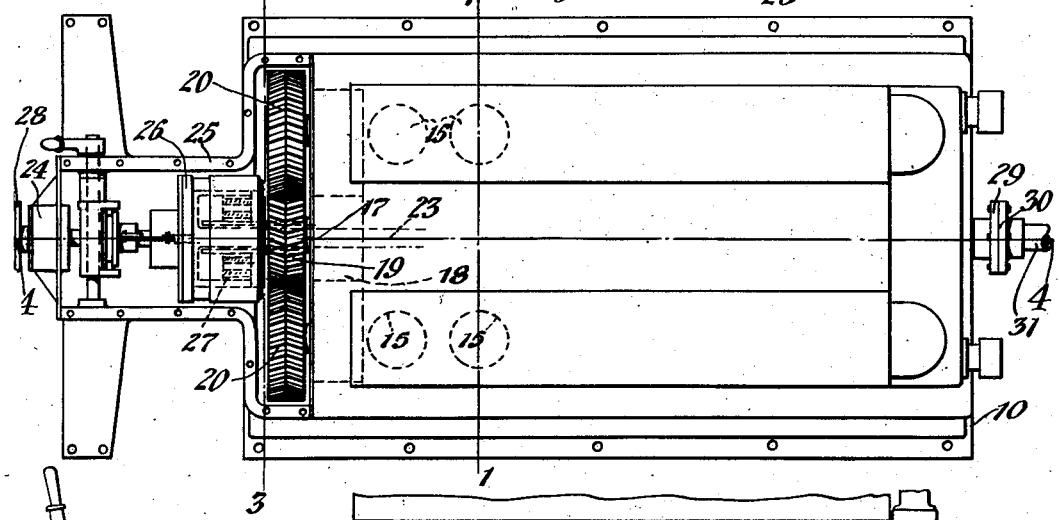
Figure 4:
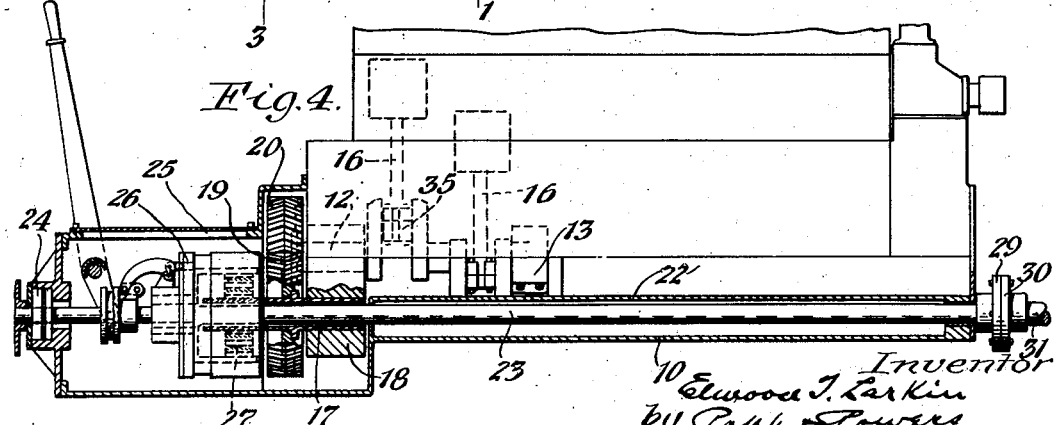

Figure 1 is a cross section of a preferred embodiment of my invention, the same being taken on line 1—1, Figure 2. Figure 2 is a top plan view of the engine containing my improvements. Figure 3 is a vertical cross section taken on line 3—3, Figure 2. Figure 4 is a vertical longitudinal section taken centrally through the machine on line 4—4, Figure 2. Figure 5 is a skeleton view of a motor boat equipped with my improved engine. Figure 6 is a fragmentary vertical longitudinal section of the engine showing a modified form of journaling the intermediate shaft of the same. Figure 7 is a similar view showing a variation in the manner of supporting each of the crank shafts of the engines.

Similar characters of reference refer to like parts in the several views.

Referring to Figures 1 to 4, the numeral 10 represents the base or crank case of the engine which may be of any suitable construction and mounted in the hull of the boat 11 in any approved manner. Arranged lengthwise and on opposite sides of the longitudinal median line of the crank case are two parallel crank shafts 12, 12, which are journaled in bearings 13 on the case and each provided with one or more crank pins or wrists 35. One or more pairs of power cylinders 14 are mounted on the base, the members of each pair being arranged over the respective crank shafts and each cylinder containing a power piston 15 which is connected by a connecting rod 16 with one of the crank pins or wrists of one of the crank shafts. These cylinders are preferably of small bore and the crank pins of short throw, so that the engine can run at high speed, although not necessarily so.

Adjacent to one end of the crank case and lengthwise between the corresponding ends of the crank shafts is an intermediate driven shaft 17 which is journaled at its inner end in a bearing 18 on the crank case so that it is parallel with the crank shafts. Motion is transmitted to this intermediate shaft from both crank shafts by means of a driven gear wheel 19 mounted on the intermediate shaft, and two driving gear wheels 20, 20 mounted respectively on the adjacent ends of the crank shafts and meshing with opposite sides of the driven gear wheel. It is to be understood that the explosion of fuel in the several cylinders is so timed and the valve mechanism so organized that the crank shafts operate in unison to turn the intermediate shaft in the same direction. The driving and driven gear wheels are preferably of the herringbone type and the meeting surfaces are supplied with oil by pipes 21, 21 or the like so as to keep the same constantly lubricated and cause them to run with a minimum amount of noise and wear.

Extending lengthwise through the intermediate shaft which is preferably hollow, and a longitudinal housing 22 in the lower part of the crank case is a main longitudinal shaft 23 which may be journaled in any suitable manner, for instance, by an inboard bearing arranged on the rear end of the base, and a thrust bearing 24 arranged at the front end of a clutch and transmission casing 25 projecting forwardly from the crank casing.

Means are provided for connecting and disconnecting the intermediate shaft and the main shaft which means preferably consist of a clutch 26 of any suitable construction combined with a speed changing gear or transmission 27 of the planetary type.

The main shaft is provided at both ends with couplings 28, 29 either one of which may be utilized for delivering power as desired. In the present instance the rear coupling 29 is connected with a corresponding coupling 30 on the front or inner end of a propeller shaft 31. The latter extends lengthwise through the bottom of the boat and is provided at its rear end with a screw 32 for propelling the boat through the water.

If desired each of the crank shafts, may be journaled outside of the respective driving gear wheel in an outboard bearing 33 on the crank case in addition to the bearing which supports the same on the inner side of this gear wheel, as shown in Figure 7, thereby aiding in correcting alinement of the gears. For the same reason the hollow intermediate shaft may also be provided with an outboard bearing 34 adjacent to the outer side of the driven gear wheel in addition to the bearing which supports this shaft adjacent to the inner side of this wheel, as shown in Figure 6.

This engine may be mounted in the hull of the boat with the gearing either at the front or at the rear, the same being shown with the gearing at the front by full lines in Figure 5, and with the gearing at the rear by dotted lines in the same figure. Due to this construction and organization of the parts an engine is produced which has a wide range of usefulness and capable of efficiently operating a high speed propeller shaft installed in a runabout motor boat or a slow speed propeller shaft for marine cruisers.

This means of driving eliminates to a great degree the tendency to lift or push upwardly the stern of the boat as has been the case in those forms of engines heretofore employed which necessitated arranging the propeller shaft at a greater angle. It follows from this that the present construction permits of utilizing a greater amount of the power developed in propelling the boat frowardly in a horizontal line, and thus increase the power of the same for a certain amount of fuel consumption.

I claim as my invention:

1. A gas engine comprising a hollow intermediate driven shaft, a main driving shaft extending lengthwise through said intermediate shaft, means for connecting and disconnecting said driving and intermediate shafts, crank shafts arranged on opposite sides of said intermediate and main shafts, power cylinders arranged on opposite sides of said intermediate and main shafts and each containing a piston operatively connected with one of said crank shafts, and means operatively connecting said crank shafts and intermediate shaft.

2. A gas engine comprising a hollow intermediate driven shaft, a main driving shaft extending lengthwise through said intermediate shaft, means for connecting and disconnecting said driving and intermediate shafts, crank shafts arranged on opposite sides of said intermediate and main shafts, power cylinders arranged on opposite sides of said intermediate and main shafts and each containing a piston operatively connected with one of said crank shafts, and means operatively connecting said crank shafts and intermediate shaft comprising a driven gear wheel mounted on said intermediate shaft, and driving gear wheels arranged on said crank shafts and meshing with said driven gear wheel.

3. A gas engine comprising a hollow intermediate driven shaft, a main driving shaft extending lengthwise through said intermediate shaft, means for connecting and disconnecting said driving and intermediate shafts, crank shafts arranged on opposite sides of said intermediate and main shafts, power cylinders arranged on opposite sides of said intermediate and main shafts and each containing a piston operatively connected with one of said crank shafts, means operatively connecting said crank shafts and intermediate shaft and a crank case supporting said cylinders and provided with bearings for said shafts.

4. A gas engine comprising a hollow intermediate driven shaft, a main driving shaft extending lengthwise through said intermediate shaft, means for connecting and disconnecting said driving and intermediate shafts, crank shafts arranged on opposite sides of said intermediate and main shafts, power cylinders arranged on opposite sides of said intermediate and main shafts and each containing a piston operatively connected with one of said crank shafts, means operatively connecting said crank shafts and intermediate shaft, and a crank case supporting said cylinders and provided with bearings for said shafts, and with a longitudinal housing for said main shaft.

5. A gas engine comprising an intermediate shaft, a main shaft, a speed varying gear and a clutch interposed between said intermediate and main shafts, crank shafts arranged on opposite sides and operatively connected with said intermediate shaft, and cylinders arranged on opposite sides of the intermediate and main shafts and having pistons connected with said crank shafts.

ELWOOD T. LARKIN.